US012558820B2

(12) United States Patent
Kharazipour et al.

(10) Patent No.: US 12,558,820 B2
(45) Date of Patent: Feb. 24, 2026

(54) METHOD FOR PRODUCING POPCORN-CONTAINING SHAPED PARTS

(71) Applicant: Georg-August-Universität Göttingen Stiftung Öffentlichen Rechts, Göttingen (DE)

(72) Inventors: Alireza Kharazipour, Göttingen (DE); Markus Euring, Rosdorf (DE)

(73) Assignee: Georg-August-Universität Göttingen Öffentlichen Rechts, Göttingen (DE)

( * ) Notice: Subject to any disclaimer, the term of this patent is extended or adjusted under 35 U.S.C. 154(b) by 370 days.

(21) Appl. No.: 17/801,521

(22) PCT Filed: Feb. 24, 2021

(86) PCT No.: PCT/EP2021/054600
§ 371 (c)(1),
(2) Date: Aug. 22, 2022

(87) PCT Pub. No.: WO2021/170676
PCT Pub. Date: Sep. 2, 2021

(65) Prior Publication Data
US 2022/0410440 A1 Dec. 29, 2022

(30) Foreign Application Priority Data
Feb. 27, 2020 (DE) .......................... 102020105205.7

(51) Int. Cl.
B29C 35/08 (2006.01)
B29C 44/34 (2006.01)
(Continued)

(52) U.S. Cl.
CPC ...... B29C 35/0805 (2013.01); B29C 44/3426 (2013.01); B29C 44/445 (2013.01);
(Continued)

(58) Field of Classification Search
CPC .................................................. B29C 44/3426
See application file for complete search history.

(56) References Cited

U.S. PATENT DOCUMENTS 3,511,899 A * 5/1970 Miller et al. ............ A23L 7/183
264/109
4,849,233 A 7/1989 Henker
(Continued)

FOREIGN PATENT DOCUMENTS

DE          42 11 888 A1    10/1993
DE    10 2006 047 279 A1    10/2008
(Continued)

*Primary Examiner* — Edmund H Lee
(74) *Attorney, Agent, or Firm* — Patent Technologies; Robert D. Gunderman, Jr.

(57) ABSTRACT

The present invention relates to two-dimensional and three-dimensional shaped parts and composite materials made of popcorn and synthetic and/or natural binding agents which are cured in automatic moulding machines or similar pressing installations by means of radio wave technology or microwaves. By means of these technologies, lightweight, two-dimensional and three-dimensional shaped parts and composite materials can be produced for packaging, as interior and exterior parts (for example in automobile and mobile-home construction), shock absorbers, space-dividing elements, furniture, consumer goods, for the building trade of for heat insulation.

11 Claims, 3 Drawing Sheets

Figure 1:
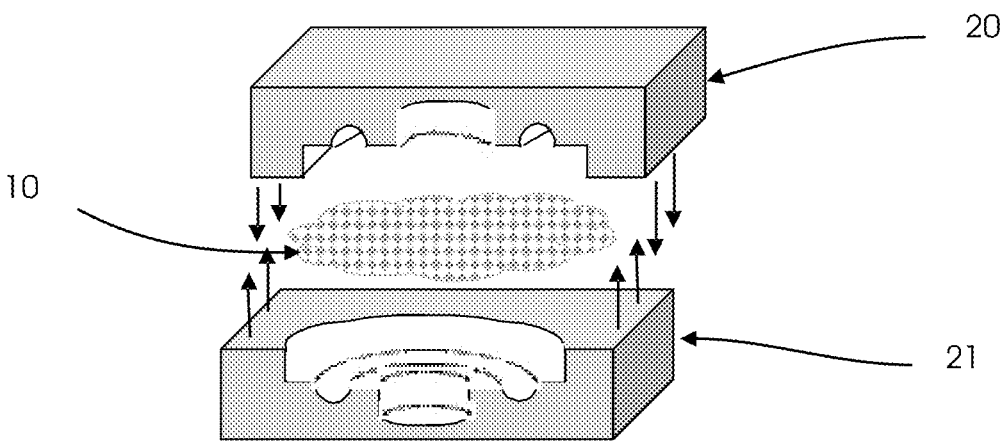

(51) Int. Cl.
  *B29C 44/44* (2006.01)
  *B29C 67/20* (2006.01)

(52) U.S. Cl.
  CPC .... *B29C 67/205* (2013.01); *B29C 2035/0855*
   (2013.01); *B29C 2035/0861* (2013.01); *B29K*
   *2003/00* (2013.01)

(56)  References Cited

U.S. PATENT DOCUMENTS

| | | | |
|---|---|---|---|
| 5,091,201 A | 2/1992 | Murata et al. | |
| 6,171,631 B1 | 1/2001 | Willoughby et al. | |
| 6,368,544 B1 | 4/2002 | Owens | |
| 8,048,464 B2 * | 11/2011 | Ramirez | ................ A23L 7/126 |
| | | | 426/559 |
| 2015/0011664 A1 | 1/2015 | Wycech | |
| 2017/0055560 A1 | 3/2017 | Sangiacomo | |

FOREIGN PATENT DOCUMENTS

| | | | |
|---|---|---|---|
| DE | 10 2007 083 374 A1 | 7/2009 | |
| DE | 10 2016 123 214 A1 | 6/2018 | |
| EP | 3 366 442 A1 | 8/2018 | |
| GB | 2 447 682 A | 9/2008 | |
| JP | 5-310271 | * | 11/1993 |
| WO | WO 2013/138414 A1 | 9/2013 | |

* cited by examiner

A     B     C     D     E

METHOD FOR PRODUCING POPCORN-CONTAINING SHAPED PARTS

The present invention relates to the field of shaped parts as used, for example, for packaging, in the automotive industry (interior and exterior), as sound absorbers, for thermal insulation or in the consumer goods industry. Such shaped parts should be easy to manufacture and also be lightweight, and preferably consist entirely or partly of renewable raw materials.

Such shaped parts have so far been made mainly from polypropylene, polyethylene, polyvinyl chloride and polystyrene. These shaped parts made from four plastic families have numerous negative characteristics in addition to positive properties, such as a low density, a hydrophobic surface, good processability and low thermal conductivity.

Negative characteristics are that the material is often very brittle and has a very low chemical resistance and softening temperature. Furthermore, products made from these plastics often exhibited a very low melting temperature, which causes the plastic to melt and drip burning even at temperatures somewhat above 100° C. These drops can catch fire and contribute to fire spread. Through the use of suitable, but often very toxic flame retardants, the flammability can be reduced. Up to now, brominated additives (polybrominated diphenyl ethers or hexabromocyclododecane), which are extremely harmful to the environment and health, have often been used.

Furthermore, these plastics are mostly produced from finite fossil raw materials, some of which are difficult to recycle. The increase of plastic waste on land and especially in the world's oceans is becoming a growing ecological problem with global significance. Combustion releases carbon dioxide, plastic particles enter the food chain, and decom-position releases pollutants. Organizations such as the EU and the UN point out that for continuing economic growth and unchanged consumption behavior the environmental problems associated with plastic will continue to increase. Due to these health and environmental problems, which are generally well known, the call for alternatives has recently become louder and louder.

It is thus an object to provide methods for producing alternative shaped parts.

This object is achieved by a method according to claim 1. Accordingly, a method for producing popcorn-containing shaped parts is proposed, in which, during the production of the shaped parts, they are temporarily subjected to targeted electromagnetic radiation in a frequency range from ≥30 kHz to ≤300 GHz.

Surprisingly, it has been found that, in such a way in many applications of the invention a large number of shaped parts with good to excellent properties (including low thermal conductivity, excellent dimensional stability, outstanding sound absorption properties and low flammability) can be produced, which thus consist predominantly of renewable raw materials, namely popcorn. Furthermore, it was surprisingly shown that the proposed method is suitable for producing popcorn-containing shaped parts, although popcorn (compared to, for example, puffed corn) has only a low water content and thus only a low efficiency of the electromagnetic radiation was to be expected. The targeted use of electromagnetic radiation in a frequency range from ≥30 kHz to ≤300 GHz has at least one or more of the following advantages for most applications:

The radiation is in the microwave or radio wave range; corresponding generators are widely available, so that the method can be carried out in a simple manner.

If the shaped parts are produced by means of automatic moulding machines with suitable cavities (see below), even higher temperatures and shorter dwell times are possible in the automatic moulding machine if the cavities are additionally equipped with heating elements.

Energy savings through the use of radio waves compared with conventional production (press process and steam injection process).

2-, 2.5- and 3-dimensional shaped parts can be produced (e.g. packaging).

Products with very low density can be manufactured (competitive with Styropor)

Production is often cheaper than for comparable plastic products.

The shaped parts are usually completely recyclable.

As will be described below, the amount of binder required can be further reduced by the method according to the invention, or the binder can even be omitted completely.

The method according to the invention enables a wide range of two- and three-dimensional shaped parts to be produced from popcorn with good to excellent properties (including very low bulk densities between 40 and 230 kg/m$^3$, low thermal conductivity, excellent dimensional stability, outstanding sound absorption properties and low flammability) at very short press times (1-5 s/mm plate thickness, in particular 2-3 s/mm plate thickness) and uniform through heating.

By use of the method according to the invention it can advantageously be achieved In particular in many applications that shaped parts with a particularly homogeneous structure compared to shaped parts made directly from puffed corn or other untreated plant parts, i.e. shaped parts in which, for example, puffed corn has been expanded within a mold by heat input, and also shaped parts with a particularly low density can be obtained.

Furthermore, by use of the method according to the invention it can be achieved in many applications in an advantageous way that compared to other shaped parts obtained, for example, from puffed corn by means of thermal treatment, shaped parts with a comparatively better stability, for example transverse tensile strength and/or lift-off strength, can be obtained. Thus, the method according to the invention also enables to realize shaped parts with a particularly low density which, compared to other shaped parts, moreover have sufficient stability and are thus of interest for various applications.

The term "popcorn" in the sense of the present invention includes in particular all materials which, like the puffed corn (*Zea mays*, convar. *Microsperma*)—optionally after appropriate greasing-explode when heated rapidly to high temperatures, in that the water present in the seed evaporates abruptly, thus converting the starch contained in the seed into a foam-like consistency. Such a behavior is known, inter alia, from *quinoa* grain, amaranth, rice or even wheat, materials based on these basic materials are also explicitly referred to and encompassed within the meaning of the present invention as "popcorn", wherein the term "popcorn" is not intended to be limited only to maize and was chosen in particular for reasons of simplicity, clarity and readability.

The term "targeted" specifically includes the use of an appropriate radiation source.

It should be noted that in the following description of the method, when "shaped parts" are referred to, the precursors of the shaped part during production are also intended to be included. The term "shaped part" is explicitly not intended to be limited only to the finished shaped part but also to include materials or articles from which the shaped parts are made during the production process, the use of the term "shaped part" also for precursor materials and articles is not for the purpose of restriction but, among other things, for better readability.

In the sense of the present invention, the term "producing the shaped parts" is particularly understood to mean a method step in which the actual shape of the shaped part is formed. In other words, in the proposed method, during a formation of the shape of the shaped part, the latter is temporarily exposed to electromagnetic radiation in a frequency range of ≥30 kHz to ≤300 GHz in a targeted manner.

According to a preferred embodiment, the method is carried out in such a way that during the application of the electromagnetic radiation, at least partial bonding and/or melting occurs at the surface of the shaped part.

According to a preferred embodiment, the method is carried out in such a way that, when the electromagnetic radiation is used, at least at a region at the surface of the shaped part a temperature of ≥70° C. is achieved. According to a preferred embodiment of the invention, this can be achieved exclusively by the use of the electromagnetic radiation. According to an alternative embodiment of the invention, additional heating means are provided. These may be, for example, heating elements or the use of hot steam.

Preferably, the method is carried out in such a way that when the electromagnetic radiation is used, a temperature of ≥100° C., still preferably ≥150° C., is achieved at least at a region at the surface of the shaped part.

According to a preferred embodiment, the electromagnetic radiation has a power of ≥20 W to ≤5000 W, still preferably ≥50 W to ≤4000 W, still more preferably ≥80 W to ≤3000 W, and most preferably ≥100 W to ≤2500 W.

According to a preferred embodiment, the shaped part is exposed to electromagnetic radiation such that the power density (measured with respect to the surface of the shaped part) is from ≥1 W/cm$^2$ to ≤250 W/cm$^2$, still preferably ≥2 W/cm$^2$ to ≤200 W/cm$^2$, still preferably ≥5 W/cm$^2$ to ≤150 W/cm$^2$, most preferably ≥10 W/cm$^2$ to ≤100 W/cm$^2$.

According to a preferred embodiment of the invention, the amplitude of the electromagnetic radiation is from ≥1 kV to ≤10 kV.

According to a preferred embodiment of the invention, radio waves are used during production. In particular, this refers to waves in the frequency range from ≥30 kHz to ≤300 MHz.

According to a preferred embodiment of the invention, microwaves are used during production. This means in particular waves in the frequency range from ≥300 MHz to ≤300 GHz.

According to a preferred embodiment, the method comprises a pressing step and, during the pressing of the shaped parts, these are temporarily exposed to electromagnetic radiation in a frequency range of ≥30 kHz to ≤300 GHz in a targeted manner. In particular, a frequency range between 25 MHz and 30 MHz is advantageous.

In accordance with a preferred embodiment of the invention, the method according to the invention comprises the following steps:

a) producing popcorn,
    b) optional hydrophobization of the popcorn produced in
        step a) by means of a polymer,
    c) optional post-treatment,
    d) optional addition of a binder,
    e) producing the shaped part, f) optional coating of the shaped part surface, and
    g) optional lamination.

According to a preferred embodiment of the invention, it is thus provided that, at least in method step e), the shaped parts are targetedly exposed to electromagnetic radiation in a frequency range from ≥30 kHz to ≤300 GHz.

The individual steps of the method are explained in more detail below, wherein any sub-steps can be combined with others as desired.

a) Production of Popcorn

Maize kernels can be caused to expand by various methods.

According to a preferred embodiment of the invention, the popcorn used for the production of the shaped parts is produced by puffing. Depending on the application, unmodified kernels can be used or suitable seeds, e.g. maize kernels are first ground and the kernel fragments are then expanded under pressure and temperature according to the Bichsel process (WO 1999042005A1), a defined process. Other processes for puffing the starch-containing kernels include, for example, hot plates, hot air machines and microwaves.

A preferred embodiment of the invention uses the so-called Cerex process from Cerex AG, CH-3368 Bleienbach. The process can be divided into three sections: preheating element, reactor and expansion chamber. First, the corn meal is uniformly heated in the preheating element to approx. 100° C., then the corn is treated with hot steam in the reactor, and at the end of the process, the corn is fed into an expansion chamber. Here, the corn kernels (maize meal) are caused to expand within a certain period of time by reducing the pressure. At the end, the puffed materials are collected and separated from the non-puffed components (Bichsel, n.d.). The conversion of corn meal to popcorn granules by the Cerex process is nearly 100% in most applications, with only less than 5% of the meal not being puffed.

Furthermore, prior to step b) the popcorn can be crushed again, so that according to a preferred embodiment of the invention the method comprises a step a1) which is carried out between steps a) and b).

a1) Crushing the Puffed Popcorn.

Step a1) can be carried out by use of any of the conventional production techniques.

b) Optional Hydrophobization by Use of a Polymer

In step b), the popcorn is hydrophobized so that it ends up essentially surrounded by polymer. This can preferably be done by mixing the popcorn and spraying it with the polymer and/or precursor substances or a solution containing the polymer and/or precursor substances.

After the hydrophobization or coating process, the result is preferably a (e.g. pneumatically) conveyable, pourable hydrophobic popcorn granulate. According to a preferred embodiment of the invention, the polymer is selected in such a way that, after hydrophobization, it is possible to crosslink the coated popcorn granules.

c) Optional Post-Treatment

According to a preferred embodiment of the invention, after step b), a post-treatment of the resulting hydrophobized popcorn is carried out. Preferably, it is heated to a temperature of ≥60° C. to ≤150° C.

This has been found to be advantageous in many applications, as it further improves the hydrophobic properties of the resulting popcorn granules.

d) Optional Addition of Binders

Depending on the application, a further binder can be added. In particular, thermoplastics, thermosets, aminoplastics, phenoplastics, isocyanates, proteins, tannins, starch, synthetic or natural binders or mixtures of binders can be used, such as urea-formaldehyde resin, melamine-formaldehyde resin, melamine-reinforced urea-formaldehyde resin, tannine-formaldehyde resin, phenol-formaldehyde resin, polymeric diphenyl methane diisocyanate, or mixtures thereof are preferred.

Preferably, the amount of binder in the shaped part (in weight percent, based on the weight of the shaped part) is ≤10%, preferably ≤5%.

The binder can be applied according to any conventional mixing or flow process, e.g. by spraying the granules in different mixing units.

e) Production of the Shaped Part

During production of the shaped part, it is temporarily exposed to electromagnetic radiation in the frequency range from ≥30 kHz to ≤300 GHz in a targeted manner.

Preferably, it can be provided that the popcorn granules are placed in a mold and temporarily exposed therein to electromagnetic radiation in a frequency range of ≥30 kHz to ≤300 GHz in a targeted manner.

The shaped part is preferably produced from the popcorn granules under slightly in-creased pressure and/or temperature. In this step, electromagnetic radiation in a frequency range of ≥30 kHz to ≤300 GHz is used in a targeted manner.

Here, preferred pressures (overpressure) are between ≥0.1 bar and ≤10 bar, preferably ≤6 bar, particularly preferably ≤5-7 bar.

Alternatively, however, the shaped part can also be produced under negative pressure.

Preferred negative pressures are ≥0.1 bar and ≤3 bar.

Preferred pressing times are ≥0.5 s/mm shaped part and ≤24 s/mm shaped part, preferably ≤8 s/mm shaped part.

Two techniques are preferably used to produce the shaped part as such:

1) Compression Molding.

This process is particularly preferred for slightly curved or flat components. The main field of application of this process is usually the automotive industry, packaging industry, where the production of larger components with two- or three-dimensional structure is concerned.

At the beginning of the process, the molding compound, i.e. the popcorn surrounded by polymer optionally with a further binder, is introduced into a cavity and sealed by use of a pressure piston. The pressure gives the molding compound the shape predetermined by the mold. The molding compound in the cavity is heated under pressure and irradiation with electromagnetic radiation in a frequency range from ≥30 kHz to ≤300 GHz.

When thermosets are used as polymers, the temperature is used, among other things, to influence the curing process, and in the case of thermoplastics to melt the plastic. The finished part can then be removed from the mold and can be further processed or coated or laminated as required (e.g. starch-based films or PU films).

2) Use of Automatic Moulding Machines

This technique usually involves the use of special automatic moulding machines that enable higher pressures and/or temperatures. Here, the first process step consists of pneumatically compressing the molding compound (i.e. the popcorn, optionally surrounded by polymer with optionally further binder) and filling the closed special automatic moulding machine with the compressed molding compound. Alternatively, the molding compound can also be conveyed into the cavity by a vacuum.

With the aid of targeted electromagnetic radiation in a frequency range from ≥30 kHz to ≤300 GHz and, if necessary, pressure, the molding compound is brought to the desired curing temperature, thereby the polymer is completely crosslinked, depending on the application.

After the popcorn particles have been crosslinked or fused together, the shaped part is removed from the mold part in the final process step. The shaped parts can then be coated or laminated (e.g. starch-based films, PU or PLA films, flocking).

f) Optional Coating of the Shaped Part Surface

Depending on the application, the shaped part surface can still be coated, e.g. by applying dies, e.g. by lacquering. The shaped part surface can also be flocked, depending on the application, it may also be advantageous to apply a further impregnation layer.

g) Optional Lamination

Depending on the application, alternatively or in addition a lamination can be carried out. In this case, usual laminating agents such as lacquer, glue or wax can be used.

The present invention also relates to a shaped part produced by a method according to the invention.

According to a preferred embodiment of the invention, the shaped part comprises both polymer and binder.

According to a preferred embodiment, the shaped part comprises substantially popcorn, polymer and Binder, or consists substantially thereof.

"Substantially" in the sense of the present invention means a proportion of ≥95% (by weight), preferably ≥97%, more preferably ≥99%. Thus, according to the present invention, the vast majority of the popcorn is surrounded by polymer.

Preferably, the summed proportion of polymer and binder is ≤15% (weight/weight) based on the shaped part, still preferably ≤10% (weight/weight). A lower proportion of polymer and binder (where present) is advantageous, as this makes the shaped part lighter and increases the proportion of renewable raw materials (=popcorn).

According to a preferred embodiment, the shaped part consists essentially of popcorn. It has been found in many embodiments of the present invention that the method according to the invention can largely dispense with binders, which is an advantage of the present invention.

According to a preferred embodiment, the popcorn is used as a whole in the shaped part, i.e., complete kernels and/or seeds are expanded and the popcorn is thereafter not used in a chopped (ground) or crushed form.

According to an alternative and equally preferred embodiment, popcorn is used that has been produced from previously crushed starting materials (e.g., maize meal). Optionally, the expanded granules can still be crushed before being processed into shaped parts.

Of course, embodiments in which both complete popcorn and popcorn treated according to the previous paragraph is used in the shaped part are also advantageous.

According to a preferred embodiment of the invention, the fat content of the popcorn before processing is ≤10 (wt.-) %.

Here, "fat content" of the popcorn is understood to mean not the total amount of fat in the popcorn, but the amount of fat that has been used to hydrophobize the seed epi-dermis, which results in better entrapment of the water contained in the seed.

It has been found favorable in many applications within the present invention to keep this fat content as low as possible, since this facilitates further processing of the popcorn. Preferably, the fat content is ≤5 (wt.-) %, according to a particularly preferred embodiment, no fat is added for the change of the consistency (conversion) (="puffing").

According to a preferred embodiment of the invention, the popcorn used for the production of the three-dimensional shaped parts is coated with a polymer after puffing (coating). Here, "coated" means that the individual popcorn particles are surrounded and/or enwrapped by the polymer, which is composed of synthetic and/or biological components. Preferably, however, no or only little general bonding takes place in the process, so that, for example, the popcorn is present as granules after enwrapping and before further processing as such, i.e. is pourable.

The polymer surrounding the popcorn is preferably a hydrophobic polymer. Preferred polymers are selected from the group comprising thermoplastics such as polypropylene, polyethylene, polyvinyl chloride, polystyrene, polyacrylate and thermosets, in particular condensed aminoplast resins. Furthermore, biologically based polymers such as polylactic acids (PLA), polyhydroxy acids such as polyhydroxy butyric acid or cellulose derivatives are suitable for coating the surface of the individual popcorn granules. The polymer can also consist of any mixture thereof. Preferably, the proportion of polymer in the shaped part (in wt.-% based on the weight of the shaped part) is 5%, preferably 3%.

According to a preferred embodiment of the invention, the shaped part comprises a binder. In particular, thermoplastics, thermosets, aminoplastics, phenoplastics, isocyanates, proteins, tannins, starch, synthetic binders or natural binders, or mixtures of binders can be used as binders, such as urea-formaldehyde resin, melamine-formaldehyde resin, melamine-reinforced-urea-formaldehyde resin, tannin-formaldehyde resin, phenol-formaldehyde resin, polymeric diphenyl-methane-diisocyanate, polyurethane or mixtures thereof are preferred.

Preferably, the proportion of binder in the shaped part (in wt.-% based on the weight of the shaped part) is ≤10%, preferably ≤5%. Preferably, the ratio of binder to polymer (weight/weight) is from ≥1:1 to ≤10:1, which has been found to be advantageous for many applications within the present invention. Preferably, the ratio of binder to polymer (in weight/weight) is from ≥1.5:1 to ≤5:1.

The shaped parts according to the invention and/or shaped parts produced according to the method according to the invention can be used in a variety of applications, including (but not limited to):

packaging materials (e.g., cooling boxes, protective packaging for electrical appliances, spice boxes, etc.), automotive parts (e.g., headrests, sun visors, child seat shells, insulating mats for interior door panels and mobile-home cabin liners), insulating materials (e.g., electrical appliances), tableware, sporting goods (e.g., yoga rollers, bolsters), toys (e.g., dices, boards for board games, puzzles), picture frames, gift hampers, composite acoustic moldings, mobile-home parts, etc. The above-mentioned components, as well as those claimed and described in the exemplary embodiments, are not subject to any particular exceptions in terms of size, shape design, material selection and technical conception, so that the selection criteria known in the field of application can be applied without any restriction.

Figure 2:
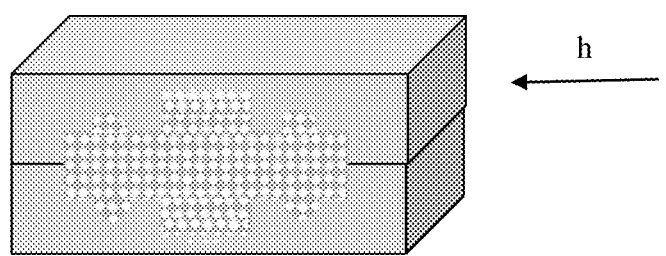
Figure 3:
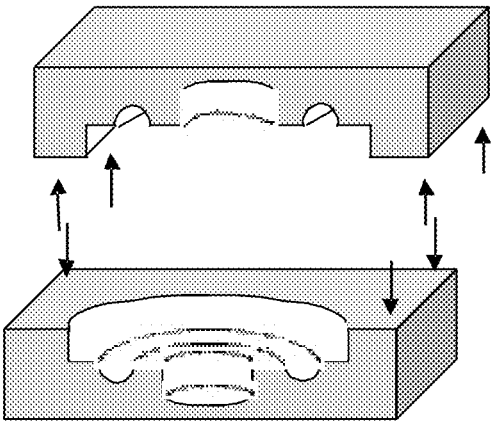
Figure 3:
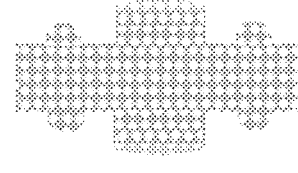
Figure 4:
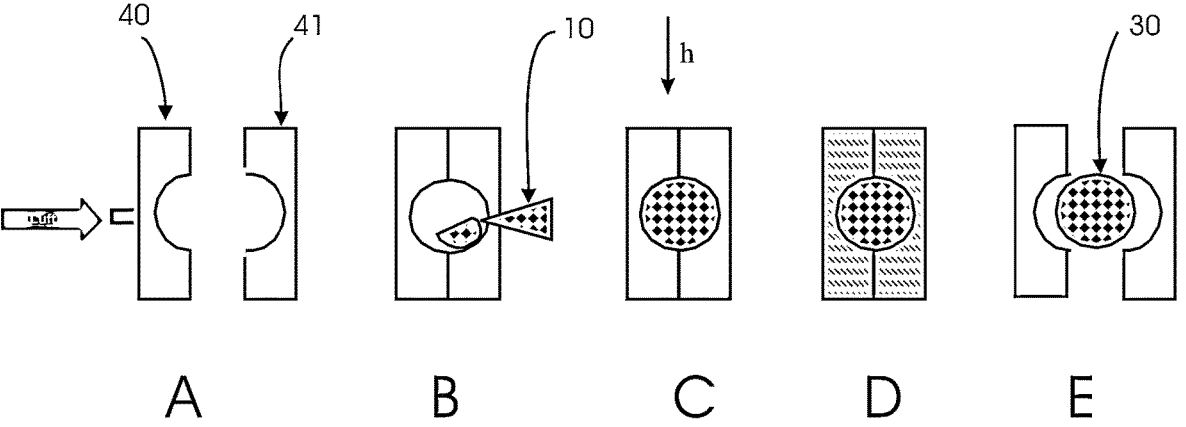
Figure 5:
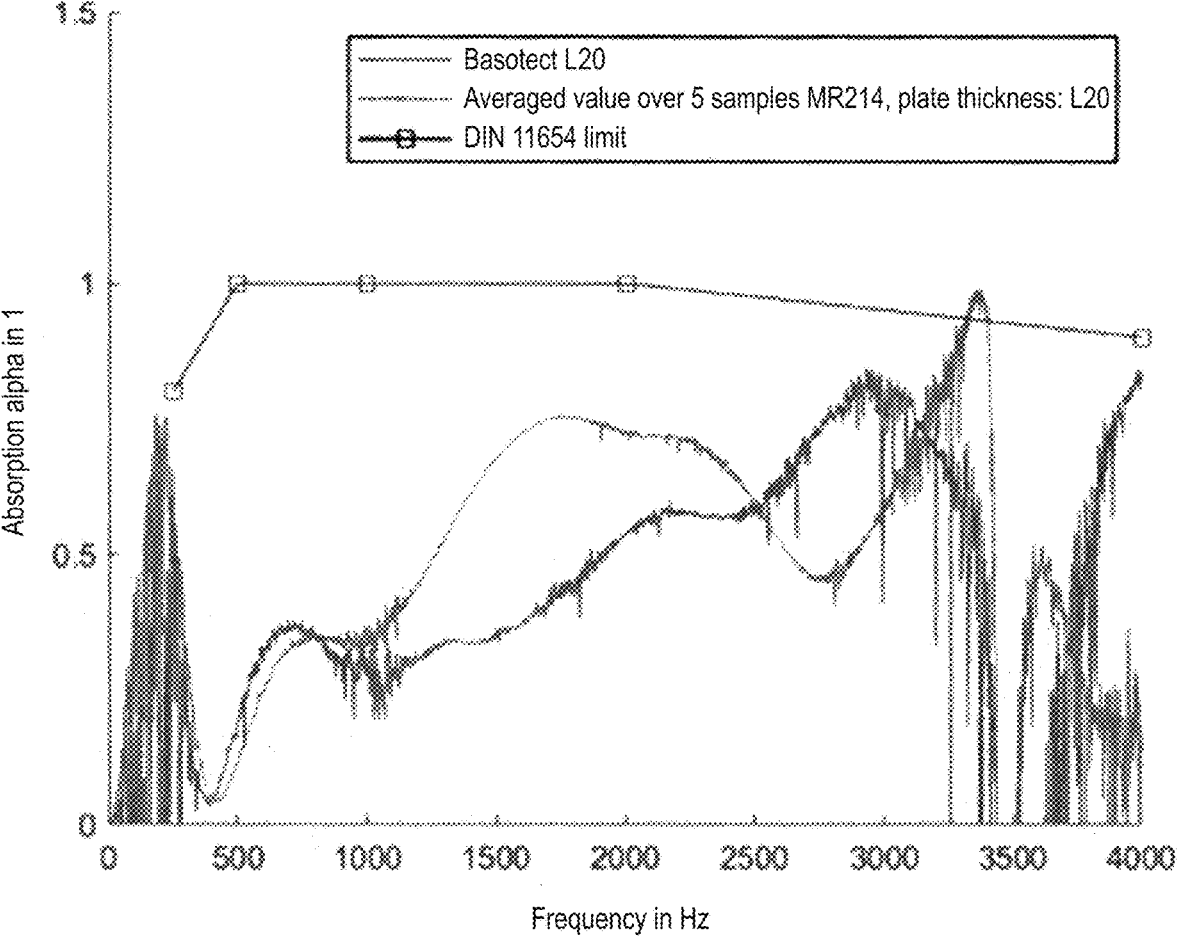

Further details, features and advantages of the subject-matter of the invention result from the subclaims as well as from the following description of the accompanying drawings, in which—by way of example—several exemplary embodiments of the method according to the invention are shown. In the drawings:

FIG. 1 to FIG. 3 schematically show the sequence of a method for producing a shaped part according to the invention in accordance with a first embodiment;

FIG. 4 shows schematically the sequence of a method for producing a shaped part according to the invention in accordance with a second embodiment; and FIG. 5 shows a diagram showing the sound absorption properties of shaped parts according to the invention and of comparative materials.

FIGS. 1 to 3 schematically show the sequence of a method for producing a shaped part according to the invention in accordance with a first embodiment. In this embodiment in step 1, shown in FIG. 1, a molding compound 10 consisting of popcorn surrounded by polymer optionally with a further binder is introduced into a cavity formed by two corresponding molding bodies 20 and 21. In step 2, shown in FIG. 2, the shaped part is targetedly exposed to electromagnetic radiation in a frequency range of ≥30 kHz to 300 GHz, so that the shaped part 30 is formed under irradiation (and possibly pressure), and is then removed in step 3, shown in FIG. 3.

FIG. 4 schematically shows the sequence of a method for producing a shaped part according to the invention in accordance with a second embodiment by means of an automatic moulding machine. Here, first the cavity formed by the two molding bodies 40 and 41 is closed (step A), and then the molding compound 10 is filled in under pressure (step B). After irradiation with electromagnetic radiation in a frequency range from ≥30 kHz to ≤300 GHz, optionally under pressure (step C) and cooling (step D), the resulting shaped part 30 can then be removed.

The invention is further explained by means of examples which are purely illustrative and are to be considered as non-limiting.

1) Production of Two- and Three-Dimensional Shaped Parts by Use of Radio Waves.

For the production of shaped parts from popcorn granules by means of radio wave technology, the popcorn granules were provided with various binders.

In the 1st variant (see Table 1), a polymer based on polypropylene and a urea-formaldehyde resin (UF, BASF Kaurit 350) were used. In the first stage, the polypropylene was applied 1% atro (based on the popcorn granules) and then the UF was sprayed onto the popcorn in a gluing unit. In the second process step, the glued material was injected by means of injection nozzles into the cavity of the automatic moulding machine, in which an optional overpressure (e.g. 0.1 to 6 bar) and approx. 5 to 7 kV radio waves are generated. Depending on the thickness and bulk density of the shaped part, dwell times of 15 to 50 seconds were used. In the final process step, the finished shaped part was removed from the cavity. Table 1 lists the mechanical-technological properties of the shaped parts produced in this way. Instead of the polymer and the UF resin, only UF resin (see Table 2) and natural binders based on albumin and rapeseed protein were used in further tests (see Table 3).

TABLE 1

Mechanical-technological properties and formaldehyde emission values of PP and UF resin-bonded shaped parts with different densities and thicknesses after crosslinking by use of radio waves

| Polymer atro Popcorn | Density [kg/m$^3$] | Thickness [mm] | QZ [kPa] | Formaldehyde emission in [mg/h · m$^2$] DIN EN 717-2 |
|---|---|---|---|---|
| PP 1% | 150 | 20 | 260 | 0.60 |
| UF 7% | | 50 | 210 | 0.65 |

TABLE 1-continued

Mechanical-technological properties and formaldehyde emission values
of PP and UF resin-bonded shaped parts with different densities
and thicknesses after crosslinking by use of radio waves

| Polymer atro Popcorn | Density [kg/m³] | Thickness [mm] | QZ [kPa] | Formaldehyde emission in [mg/h · m²] DIN EN 717-2 |
|---|---|---|---|---|
| PP 1% | 120 | 20 | 190 | 0.51 |
| UF 7% | | 50 | 182 | 0.55 |
| PP 1% | 90 | 20 | 179 | 0.40 |
| UF 7% | | 50 | 140 | 0.43 |
| PP 1% | 60 | 20 | 100 | 0.30 |
| UF 7% | | 50 | 85 | 0.36 |

TABLE 2

Mechanical-technological properties and formaldehyde emission
values of UF resin-bonded shaped parts with different densities
and thicknesses after crosslinking by radio waves

| Binder atro Popcorn | Density [kg/m³] | Thickness [mm] | QZ [kPa] | Formaldehyde emission in [mg/h · m²] DIN EN 717-2 |
|---|---|---|---|---|
| UF 8% | 150 | 20 | 300 | 0.66 |
| | | 50 | 275 | 0.69 |
| UF 8% | 120 | 20 | 258 | 0.56 |
| | | 50 | 240 | 0.59 |
| UF 8% | 90 | 20 | 220 | 0.43 |
| | | 50 | 205 | 0.46 |
| UF 8% | 60 | 20 | 140 | 0.33 |
| | | 50 | 128 | 0.39 |

TABLE 3

Mechanical-technological properties and formaldehyde emission
values of albumin or rape protein-bonded shaped parts with different
densities after crosslinking by means of radio waves

| Binder atro Popcorn | Density [kg/m³] | Thickness [mm] | QZ [kPa] |
|---|---|---|---|
| Albumin 10% | 160 | 30 | 220 |
| Rape protein 9% | | | 205 |
| Albumin 10% | 120 | 30 | 175 |
| Rape protein 9% | | | 155 |
| Albumin 10% | 80 | 30 | 135 |
| Rape protein 9% | | | 105 |

Moreover, for the production of 20 mm thick flexible shaped parts made of popcorn granules, a double gluing process was carried out, in which the popcorn granules were first coated with liquid gelatine (approx. 50% solids content, Fritz Häcker GmbH) in a dosage % based on atro popcorn. After drying at 70° C. in a flash drier, the material was glued with MUF (66% solids content, BASF Kauramin 620), UF (BASF Kaurit 350) and PUR (Hexion) in various dosages atro on popcorn with gelatin and introduced into the cavity as a molding compound, which was then crosslinked with use of overpressure (e.g. 0.1 to 6 bar) and radio waves. After a total of 30 seconds (1.5 s/mm plate thickness), the finished, flexible shaped part is removed from the cavity and conditioned. Table 4 lists the mechanical-technological properties of these flexible shaped parts.

TABLE 4

Mechanical-technical properties and formaldehyde emission
values of gelatin, UF resin, MUF resin and PUR-bonded
shaped parts after crosslinking by means of radio waves

| Polymer atro Popcorn | Density [kg/m³] | Bending strength [N/mm²] | QZ [kPa] | Formaldehyde emission in [mg/h · m²] DIN EN 717-2 |
|---|---|---|---|---|
| Gelatine 4% UF 6% | 150 | 5.3 | 230 | 0.65 |
| Gelatine 4% MUF 6% | 150 | 5.9 | 280 | 0.43 |
| Gelatine 5% PUR 3% | 150 | 10.0 | 350 | not detectable |

2) Production of Two- and Three-Dimensional Shaped Parts by Means of Radio Waves without Binders Popcorn granules were produced according to example 1) by the Bichsel process and then compressed without any wetting of synthetic and/or natural binders and additives in an automatic moulding machine by means of radio waves at 6 kV and an overpressure of 0.5 bar. Surprisingly, it has been found that even without the use of any binder and additives, a certain crosslinking between the individual popcorn granules takes place due to the caramelization and simultaneous Maillard reaction on the surface of the starch granules. Accordingly, the following mechanical-technological properties have been determined (Table 5).

TABLE 5

Mechanical-technological properties of binder-free shaped
parts after crosslinking by means of radio waves

| Gluing atro Popcorn | Density [kg/m³] | Bending strength [N/mm²] | QZ [kPa] |
|---|---|---|---|
| 0% | 120 | 1.1 | 15 |
| 0% | 80 | 0.9 | 11 |
| 0% | 60 | 0.25 | 8 |

3) Production of Two- and Three-Dimensional Shaped Parts by Use of Radio Waves Using PLA (Polylactic Acid).

For the production of shaped parts from popcorn granules by use of radio wave technology and PLA, the popcorn granules were treated as follows:

The powdered PLA was mixed with the popcorn granules at a dosage of 8% atro (based on the popcorn granules) in a gluing unit by use of hot air at 140° C. The heating process made the PLA flowable and evenly distributed on the popcorn surface. Then, the PLA-coated granules were conveyed into the automatic moulding machine and cured by use of radio waves at 8.3 kV and a negative pressure of 2.8 bar for 4 s/mm of shaped part thickness (wall thickness 20 mm).

In the final process step, the finished shaped part was removed from the cavity. The following Table 6 shows the mechanical-technological properties:

TABLE 6

| Mechanical-technological properties of PLA-bonded shaped parts after crosslinking by use of radio waves | | | |
| --- | --- | --- | --- |
| Gluing atro Popcorn | Density [kg/m³] | Bending strength [N/mm²] | QZ [kPa] |
| PLA 8% | 120 | 4.9 | 140 |
| PLA 8% | 80 | 2.7 | 105 |
| PLA 8% | 40 | 1.8 | 65 |

4) Production of Two- and Three-Dimensional Shaped Parts Using Microwaves.

For the production of shaped parts from popcorn granules by use of microwave technology, the popcorn granules were provided with melamine-reinforced urea-formaldehyde resin (MUF, BASF 5 Kauramin 620).

First, the MUF was applied at 8% atro (based on the popcorn granules) in a gluing unit to the popcorn. Subsequently, the glued material was conveyed by a pneumatic filling system into the cavity of the automatic moulding machine, in which the dielectric heating of the popcorn granules took place at a microwave power of approx. 1.2 to 3 kW. Depending on the thickness and bulk density of the shaped part, dwell times of up to 90 seconds were used. Finally, the finished shaped part was removed from the cavity. Table 7 lists the mechanical-technical properties of the shaped parts produced by use of microwave technology.

TABLE 7

| Mechanical-technological properties and formaldehyde emission values of MUF resin-bonded shaped parts with different densities and thicknesses after crosslinking by use of microwaves | | | | |
| --- | --- | --- | --- | --- |
| Binder atro Popcorn | Density | Thickness [mm] | QZ [kPa] | Formaldehyde emission in [mg/h · m²] DIN EN 717-2 |
| MUF 8% | 150 | 20 | 300 | 0.45 |
| | | 50 | 275 | 0.48 |
| MUF 8% | 120 | 20 | 258 | 0.38 |
| | | 50 | 240 | 0.43 |
| MUF 8% | 90 | 20 | 220 | 0.29 |
| | | 50 | 205 | 0.36 |
| MUF 8% | 60 | 20 | 140 | 0.22 |
| | | 50 | 128 | 0.25 |

5) Production of Two- and Three-Dimensional Shaped Parts with Different Popcorn Granule Sizes by Use of Radio Waves Using PLA (Polylactic Acid) and Urea Formaldehyde Resin (UF).

For the production of shaped parts from popcorn granules by use of radio wave technology and PLA and UF, the popcorn granules were treated as follows.

The popcorn granules were separated into different granule sizes (fraction 1: 1 mm-2.5 mm and fraction 2: 2.6 mm-4.5 mm) directly after the expansion process and treated separately.

The liquid PLA solution was applied at a dosage of 5-8% atro (based on the popcorn granules) separately to both fractions in a gluing unit. Both fractions were dried at approx. 60-80° C. Subsequently, the PLA-coated fractions were glued with 5-8% UF resin in a gluing unit and, depending on the above-mentioned fraction size 1 and 2, alternately pneumatically conveyed into the automatic moulding machine. Thus, multilayer shaped parts were produced in which the different fractions were layered on top of each other. There is also the possibility that, depending on the properties of the shaped parts, the popcorn granule sizes are mixed in a targeted manner, whereby adhesion forces on the individual granule surfaces are reinforced. The shaped parts were cured by use of radio waves at 7 kV and a negative pressure of 0.6 bar for 4 s/mm of shaped part thickness.

In the final process step, the finished shaped part was removed from the cavity. In the following Table 8 the mechanical-technological properties are shown:

TABLE 8

| Mechanical-technological properties of PLA und UF-bonded shaped parts after crosslinking by use of radio waves | | | | |
| --- | --- | --- | --- | --- |
| Gluing atro Popcorn | Density [kg/m³] | Bending strength [N/mm²] | [N/mm²] | Heat conductivity λ [W/m · K)] |
| PLA 5% + UF 8% | 120 | 5.1 | 0.23 | 0.040 |
| PLA 8% + UF 5% | 120 | 5.3 | 0.25 | 0.041 |
| PLA 5% + UF 8% | 80 | 3.8 | 0.22 | 0.0385 |
| PLA 8% + UF 5% | 80 | 3.6 | 0.21 | 0.0380 |
| PLA 5% + UF 8% | 60 | 1.8 | 0.18 | 0.0372 |
| PLA 8% + UF 5% | 60 | 1.6 | 0.15 | 0.0375 |

It should be noted that the production method according to the invention can be further varied, whereby additional preferred embodiments of the invention are provided.

For example, in a further variant, fractions 1 and 2 are first coated together, glued and then separated.

Furthermore, it should be noted that it is possible to achieve positive effects, such as, among others, better surface adhesion, better sound absorption properties, lower thermal conductivity properties, by varying the different granule sizes, and thus to further noticeably improve the physical-technological properties.

In particular, the sound absorption properties were investigated in more detail. FIG. 5 shows the sound absorption properties of flat popcorn shaped parts produced according to the invention (upper curve in the range 1500-2000 Hz) compared with those of Basotec L materials available on the market (lower curve in the range 1500-2000 Hz). DIN 11654, which is also registered as a reference, describes the recommended sound absorption limit in the frequency range 0 to 4000 Hz. It can be seen that the popcorn shaped parts are very suitable for sound absorption purposes and even outperform some commercially available materials.

The individual combinations of the components and the features of the already mentioned embodiments are exemplary; the interchange and substitution of these teachings with other teachings included in this publication with the cited printed matter are also expressly contemplated. Those skilled in the art will recognize that variations, modifications and other embodiments described herein may also occur without departing from the spirit and scope of the invention. Accordingly, the above description is exemplary and is not to be considered as limiting. The word "comprise" used in the claims does not exclude other components or steps. The indefinite article "a" does not exclude the meaning of a plural. The mere fact that certain measures are recited in mutually different claims does not indicate that a combination of these measures cannot be used advantageously. The scope of the invention is defined in the following claims and the associated equivalents.

The invention claimed is:

1. A method for producing popcorn-containing shaped parts, the method comprising the steps of:

a) production of puffed popcorn granules;

b) optional hydrophobization of the puffed popcorn granules produced in step a) by means of a polymer;

c) optional post-treatment of the hydrophobized puffed popcorn granules;

d) optional addition of a binder to the puffed popcorn granules;

e) addition of the puffed popcorn granules to a mold cavity;

f) application of pressure or vacuum to the mold cavity containing puffed popcorn granules;

g) temporary exposure of the puffed popcorn granules contained in the mold cavity in a targeted manner to electromagnetic radiation in a frequency range from ≥30 kHz to ≤300 GHz to produce a shaped part;

h) optional coating of a surface of the shaped part; and i) optional lamination of the shaped part to another shaped part.

2. The method according to claim 1, wherein the electromagnetic radiation is radio and/or microwave radiation.

3. The method according to claim 1, wherein, when the electromagnetic radiation is used, at least partial bonding and/or melting takes place at the surface of the shaped part.

4. The method according to claim 1, wherein a temperature of ≥70° C. is achieved at least at a region on the surface of the shaped part when the electromagnetic radiation is used.

5. The method according to claim 1, wherein the electromagnetic radiation has a power of ≥20 W to ≤5000 W.

6. The method according to claim 1, wherein the power density (measured with respect to the surface of the shaped part) is from ≥1 W/cm² to ≤250 W/cm².

7. The method according to claim 1, wherein step d) is carried out by means of compression molding and/or use of automatic moulding machines.

8. The method according to claim 1, further comprising the step of compressing the puffed popcorn granules that have been added to the mold cavity with a compression time of ≥0.5 s/mm shaped part and ≤24 s/mm shaped part is used.

9. The method according to claim 1, wherein in step f) an overpressure of ≥0.1 bar and ≤10 bar is used.

10. The method according to claim 1, wherein in step f) a negative pressure of ≥0.1 bar and ≤3 bar is used.

11. A method for producing popcorn-containing shaped parts, the method comprising the steps of:

a) production of puffed popcorn granules;

b) optional hydrophobization of the popcorn produced in step a) by means of a polymer;

c) optional post-treatment of the hydrophobized puffed popcorn granules;

d) addition of the puffed popcorn granules to a mold cavity without the addition of a binder;

e) application of pressure or vacuum to the mold cavity containing puffed popcorn granules;

f) temporary exposure of the puffed popcorn granules contained in the mold cavity in a targeted manner to electromagnetic radiation in a frequency range from ≥30 KHz to ≤300 GHz to produce a shaped part;

g) optional coating of a surface of the shaped part; and h) optional lamination of the shaped part to another shaped part.

* * * * *